United States Patent Office 3,446,868
Patented May 27, 1969

3,446,868
DISPROPORTIONATION OF PROPANE
E. O. Box, Jr., Bartlesville, Okla., assignor to Phillips Petroleum Company, a corporation of Delaware
No Drawing. Filed Jan. 3, 1967, Ser. No. 606,560
Int. Cl. C07c 9/10, 3/62
U.S. Cl. 260—676         6 Claims

ABSTRACT OF THE DISCLOSURE

Propane is disproportionated into ethane and butanes by contact with an acidic cracking catalyst.

---

This invention relates to the disproportionation of propane into ethane and butanes. In one aspect, this invention relates to a method for disproportionating propane. In another aspect, this invention relates to catalysts for use in the disproportionation of propane.

One of the problems facing the oil industry is that there is no market, except for the low-value fuel market, for a large part of the large reserves of propane that is usually associated with the refining of crude oil to produce marketable products. At the present time, the demand for ethane or butane is considerably greater than for propane.

It is an object of the present invention to provide a method for the disproportionation of propane into hydrocarbons having higher and lower number of carbon atoms than propane. It is also an object of this invention to provide catalysts and operating conditions for the disproportionation of propane. Still another object of this invention is to provide a method for the disproportionation of propane to produce ethane and butane. The provision of a catalyst for the disproportionation of propane to produce ethane and butane is still another object of this invention. Other aspects, objects and advantages of the invention will become apparent to those skilled in the art upon a study of this disclosure including the detailed description of the invention.

It has now been discovered that propane can be disproportionated to produce butanes and ethane in good yield by contacting the propane with an acidic cracking catalyst at superatmospheric pressure and at a temperature just below that at which substantial cracking occurs.

The catalysts that can be used in the disproportionation of propane are those acidic materials known to the industry that are used in catalytic cracking and as supports for hydroforming and reforming catalysts and the like. Examples of materials that can be used are the binary and ternary combinations of silica with alumina, zirconia, and magnesia such as silica-alumina, silica-zirconia, silica-magnesia, silica-zirconia-alumina, and the like; halogen or hydrogen halide-treated alumina; claylike cracking catalysts; natural and synthetic zeolites, and the like.

The catalysts can also be treated with or used with a halogen or a hydrogen halide, preferably fluorine, hydrogen fluoride, chlorine, or hydrogen chloride. The halogen or hydrogen halide appears to act as an adjuvant or promoter for the acidic cracking catalyst.

One particularly preferred catalyst employed in the process of this invention is a particular form of zeolite known as mordenite. Mordenite is characterized by its high silicon to aluminum ratio of about 5:1 and its crystal structure. Mordenite is a naturally occurring mineral; however, a synthetic mordenite, known as Zeolon, has become available commercially from the Norton Company. The hydrogen form of mordenite is particularly preferred for the process of this invention whether synthetic or naturally occurring.

The present invention resides in the discovery that by operating at a pressure of about 250 to 1500 p.s.i.g. (pounds per square inch gauge), preferably about 500 to 1000 p.s.i.g., and at temperatures just below those at which substantial cracking is obtained, propane is disproportionated to ethane and butanes. The temperature used depends in part upon the cracking activity of the catalyst, a more-active catalyst requiring a somewhat lower temperature than a less-active catalyst. However, the temperature is usually within the range of about 700 to 1000° F., preferably about 750 to 950° F. Contact time will be that necessary to produce products of disproportionation of propane. Contact times of about 0.1 to 100 minutes, preferably about 3 to 30 minutes, are useful. Contact time is defined by the volume of free space in the catalyst bed divided by the volume of propane at reaction conditions fed to the catalyst bed.

The acidic catalyst can be promoted by the addition of about 5 to 25 weight percent of nickel phosphate to the acidic support to improve the catalyst activity and to increase conversion of the paraffinic hydrocarbon. It has also been discovered that propane can be disproportionated with alumina promoted with nickel phosphate if the conversion is carried out in the presence of a hydrogen halide such as hydrogen chloride.

The cracking catalysts applicable for use in the present invention require no special treatment; however, it will frequently be advisable to treat the catalyst with an acidic material such as hydrogen halide vapors prior to use. It is thought that such treatment tends to acidify any basic sites which may be present in the catalyst.

When the catalyst is treated with the acidic material such as hydrogen chloride, the treatment is accomplished by passing a gas, such as air or nitrogen, containing about 10 to 30 weight percent of the hydrogen chloride, over the predried catalyst at a temperature of about 800 to 1200° F. for 0.5 to 10 hours.

When the hydrogen halide is admixed with the feed, it is usually used in an amount of about 0.5 to 10 weight percent of the feed. An excess of the hydrogen halide is not harmful, therefore, amounts in excess of 10 percent can be used.

An understanding of the invention may be facilitated by reference to the following specific embodiments of the invention which, however, should be considered exemplary and should not be construed as unduly limiting the invention.

EXAMPLE I

A typical silica-alumina cracking catalyst of commerce containing 12 weight percent alumina and 88 weight percent silica was used in the form of molded cylindrical pellets about ⅛ inch in diameter and length. The catalyst was heated to about 1000° F. in nitrogen and then nitrogen containing 10 to 20 weight percent hydrogen chloride was added and heating continued for two hours at 1000° F. The conditions and results obtained in disproportionating propane with this catalyst are shown in the following Table I.

TABLE I

| Run No. | 1 | 2 | 3 |
|---|---|---|---|
| Pressure, p.s.i.g. | 500 | 500 | 500 |
| Temperature, °F. | 695 | 920 | 1000 |
| Contact time, min. | 7.9 | 7.3 | 4.7 |
| HCl, wt. percent of $C_3H_8$ | 1 | 1 | 1 |
| Conversion, wt. percent | 1.5 | 18.5 | 25.4 |
| Product composition, wt. percent: | | | |
| Methane | 16.0 | 24.1 | 45.8 |
| Ethane | 20.6 | 34.8 | 40.6 |
| Propylene | 0.0 | 0.5 | 1.3 |
| i-Butane | 20.7 | 14.3 | 4.1 |
| n-Butane | 18.7 | 19.3 | 5.0 |
| Pentanes | 16.7 | 5.2 | 1.9 |
| Heavier | 7.3 | 1.8 | 1.3 |

The above data show that propane was disproportionated to lighter and heavier materials.

EXAMPLE II

Additional runs were made at a pressure of 1000 p.s.i.g., in which temperature and residence time were varied, and wherein runs were made with and without the addition of hydrogen chloride. The results of these runs are shown in the following Table II.

TABLE II

| Run No. | 4 | 5 | 6 |
|---|---|---|---|
| Temperature, °F | 800 | 920 | 920 |
| Contact time, min | 18.7 | 8.5 | 8.5 |
| HCl, wt. percent of $C_3H_8$ | 1 | 1 | 0 |
| Conversion, wt. percent | 9.0 | 19.1 | 16.5 |
| Product composition, wt. percent: | | | |
| Methane | 13.8 | 28.2 | 26.4 |
| Ethane | 19.0 | 37.0 | 31.2 |
| Propylene | 0.0 | 0.4 | 0.7 |
| i-Butane | 25.5 | 13.3 | 16.1 |
| n-Butane | 29.6 | 16.1 | 19.7 |
| Pentanes | 8.3 | 4.2 | 5.8 |
| Heavier | 3.8 | 0.8 | 0.1 |

The above data show that good yields of ethane and butane were obtained at 1000 p.s.i.g. and that HCl-addition is beneficial but is not necessary.

EXAMPLE III

A synthetic hydrogen mordenite, identified as Zeolon H, obtained from the Norton Company, was dried in air at 1100° F. and used in the disproportionation of propane in three runs; the results obtained in those runs and the conditions of operation are shown in the following Table III.

TABLE III

| Run No. | 7 | 8 | 9 |
|---|---|---|---|
| Pressure, p.s.i.g | 1,000 | 1,000 | 1,000 |
| Temperature, °F | 600 | 645 | 700 |
| Contact time, min | 18.0 | 11.1 | 10.4 |
| HCl, wt. percent of propane | 1 | 1 | 1 |
| Conversion, wt. percent | 16.6 | 25.2 | 20.9 |
| Product composition, wt. percent: | | | |
| Methane | 11.0 | 10.6 | 15.2 |
| Ethane | 7.8 | 21.7 | 32.6 |
| Propylene | Trace | Trace | Trace |
| Isobutane | 33.8 | 26.3 | 18.6 |
| Normal butane | 37.5 | 31.1 | 25.3 |
| Pentanes | 9.9 | 8.8 | 6.2 |
| Heavier | | 1.5 | 2.1 |

The above data show that propane was effectively disproportionated with good yields of butanes.

EXAMPLE IV

Three different support materials in the form of cylindrical pellets of about ⅛″ in diameter and length were impregnated with sufficient aqueous nickel phosphate solution to give the indicated concentrations of nickel phosphate in the finished catalyst, dried and calcined at 900 to 1000° F. The supports were as follows:

(1) A typical silica-alumina cracking catalyst of commerce containing 12 weight percent alumina and 88 weight percent silica;
(2) A gamma-alumina of commerce; and
(3) An eta-alumina of commerce.

Hydrogen chloride which is an optional adjuvant with silica-alumina but a necessary adjuvant with alumina-supported nickel phosphate, was blended with the propane feed. The conditions of operation and the results of the runs are shown in the following Table IV.

TABLE IV

| | Run No. | | | |
|---|---|---|---|---|
| | 10 | 11 | 12 | 13 |
| Catalyst | Silica alumina | 10 nickel phosphate- 90 silica-alumina | 20 nickel phosphate- 80 gamma-alumina | 20 nickel phosphate- 80 eta-alumina |
| Temperature, °F | 920 | 800 | 850 | 755 |
| Pressure, p.s.i.g | 1,000 | 1,000 | 1,000 | 1,000 |
| Contact time, min | 8.5 | 20.0 | 11.0 | 9.7 |
| HCl, wt. percent of $C_3H_8$ | 1 | 1 | 1 | 1 |
| Conversion, wt. percent | 19.1 | 17.1 | 10.2 | 12.6 |
| Product composition, wt. percent: | | | | |
| Methane | 28.2 | 9.9 | 16.7 | 10.6 |
| Ethane | 37.0 | 18.5 | 22.1 | 17.6 |
| Propylene | 0.4 | 0.0 | 0.2 | 0.0 |
| i-Butane | 13.3 | 24.8 | 20.4 | 25.2 |
| n-Butane | 16.1 | 34.8 | 28.0 | 32.7 |
| Pentanes | 4.2 | 9.3 | 8.5 | 10.0 |
| Heavier | 0.8 | 2.7 | 4.1 | 3.9 |

These data show that the addition of nickel phosphate to silica-alumina increased the yield of butanes and decreased cracking, and that good yields of butane were obtained when an alumina support is used together with a hydrogen halide such as hydrogen chloride. All of the analyses of all of the examples were by gas chromatography.

That which is claimed is:

1. A process for disproportionating propane into paraffin hydrocarbons at least one of which has more than three carbon atoms per molecule and at least one of which has less than three carbon atoms per molecule which comprises contacting propane in a conversion zone with a solid, acidic cracking catalyst selected from the group consisting of binary and ternary combinations of silica with alumina, zirconia and magnesia; halogen treated alumina; hydrogen halide treated alumina; clay type cracking catalysts; natural and synthetic zeolites; and combinations with nickel phosphate at conditions, including conditions of temperature in the range of about 500–1000° F., pressure and contact time, suitable to produce products of disproportionation; and recovering from said conversion zone paraffin hydrocarbons having both higher and lower numbers of carbon atoms than propane.

2. The process of claim 1 wherein the pressure is in the range of about 250 to 1500 p.s.i.g.; and the contact time is in the range of about 0.1 to 100 minutes.

3. The process of claim 1 wherein the catalyst is treated with a hydrogen halide prior to use in the disproportionation reaction.

4. The process of claim 1 wherein a hydrogen halide is admixed with the propane.

5. The process of claim 1 wherein the catalyst is a zeolite.

6. The process of claim 4 wherein the zeolite is hydrogen mordenite.

References Cited

UNITED STATES PATENTS 3,280,212   10/1966   Miale et al. _____ 260—683.65
3,281,483   10/1966   Benesi et al. _____ 260—672

DELBERT E. GANTZ, *Primary Examiner.*

J. D. MYERS, *Assistant Examiner.*